US 9,584,958 B2

(12) United States Patent
Brands

(10) Patent No.: US 9,584,958 B2
(45) Date of Patent: Feb. 28, 2017

(54) MOBILE DEVICE, METHOD FOR FACILITATING A TRANSACTION, COMPUTER PROGRAM, ARTICLE OF MANUFACTURE

(71) Applicant: NXP B.V., Eindhoven (NL)

(72) Inventor: Jan René Brands, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/927,385

(22) Filed: Oct. 29, 2015

(65) Prior Publication Data

US 2016/0127859 A1    May 5, 2016

(30) Foreign Application Priority Data

Oct. 30, 2014    (EP) ..................................... 14191176

(51) Int. Cl.
| | |
|---|---|
| *H04B 5/00* | (2006.01) |
| *H04W 4/00* | (2009.01) |
| *H04W 12/08* | (2009.01) |
| *H04L 29/06* | (2006.01) |
| *H04W 12/06* | (2009.01) |

(52) U.S. Cl.
CPC ......... *H04W 4/008* (2013.01); *H04L 63/0853* (2013.01); *H04L 63/18* (2013.01); *H04W 12/06* (2013.01); *H04W 12/08* (2013.01)

(58) Field of Classification Search
CPC ...... H04B 1/3816; H04B 1/005; H04W 4/008
USPC .................. 455/41.1, 41.2, 558, 550.1, 552.1
See application file for complete search history.

(56) References Cited

U.S. PATENT DOCUMENTS

| | | | | |
|---|---|---|---|---|
| 8,923,763 | B2 * | 12/2014 | O'Donoghue | H04W 4/008 455/41.1 |
| 2010/0063893 | A1 * | 3/2010 | Townsend | G06Q 20/12 705/26.1 |
| 2012/0233456 | A1 | 9/2012 | Spitz et al. | |

(Continued)

FOREIGN PATENT DOCUMENTS

| | | |
|---|---|---|
| EP | 2 738 706 A1 | 6/2014 |
| EP | 2 908 262 A1 | 8/2015 |

(Continued)

OTHER PUBLICATIONS

Extended European Search Report for Patent Appin. No. 14191176.8 (Apr. 14, 2015).

(Continued)

*Primary Examiner* — Tuan Pham

(57) ABSTRACT

There is disclosed a mobile device comprising: a near field communication unit, a further communication unit being connected to the near field communication unit and being arranged to communicate with an external input device, a secure element being connected to the near field communication unit and being arranged to execute at least one application, the near field communication unit further being arranged to request, via the further communication unit, user input data for said application from the external input device, to receive said user input data from the external input device via the further communication unit, and to forward said user input data to the secure element. Furthermore, a corresponding method for facilitating a transaction, a corresponding computer program, and a corresponding article of manufacture are disclosed.

13 Claims, 3 Drawing Sheets

(56) References Cited

U.S. PATENT DOCUMENTS

| | | |
|---|---|---|
| 2013/0144792 A1 | 6/2013 | Nilsson et al. |
| 2014/0096222 A1 | 4/2014 | Colnot |
| 2014/0156872 A1 | 6/2014 | Buer et al. |
| 2014/0169560 A1 | 6/2014 | Stotzer et al. |
| 2014/0195429 A1* | 7/2014 | Paulsen ................ G06Q 20/382 705/44 |

FOREIGN PATENT DOCUMENTS

| | | |
|---|---|---|
| JP | 2014-110638 A | 6/2014 |
| JP | 2014-123213 A | 7/2014 |
| WO | 2014/132212 A1 | 9/2014 |

OTHER PUBLICATIONS

"Single Chip, Dual-Band (2.4 GHz / 5 GHz) 802.11 g/n MAC/Baseband/Radio with Integrated Bluetooth 4.0, NFC + FM Receiver", Broadcom, 1 pg, retrieved from Internet Archive Wayback Machine at: https://web.archive.org/web/20140921184321/http://www.broadcom.com/products/NFC/NFC-Solutions/BCM43341 (Sep. 21, 2014).

"Smartwatches", 20 pgs, retrieved from the Internet Archive Wayback Machine at: https://web.archive.org/web/20140921063440/http://www.connectedly.com/smartwatches (Sep. 21, 2014).

"Google Wallet", Google, 3 pgs, retrieved from Internet Archive Wayback Machine at: https://web.archive.org/web/20140921064543/http://www.google.com/wallet/ (Sep. 21, 2014).

Counterpart Japanese Patent Application No. JP2015-170025 office action dated Sep. 13, 2016.

* cited by examiner

MOBILE DEVICE, METHOD FOR FACILITATING A TRANSACTION, COMPUTER PROGRAM, ARTICLE OF MANUFACTURE

CROSS-REFERENCE TO RELATED APPLICATIONS

This application claims the priority under 35 U.S.C. §119 of European patent application no. 14191176.8, filed on Oct. 30, 2014, the contents of which are incorporated by reference herein.

FIELD

The present disclosure relates to a mobile device. Furthermore, the present disclosure relates to a corresponding method for facilitating a transaction, a corresponding computer program, and a corresponding article of manufacture.

BACKGROUND

Today, many applications which are executed on mobile devices require some form of user authentication. For example, a personal identification number (PIN) may be required for unlocking the functionality of a given application. Many of these applications are executed in relatively secure environments in mobile devices that are equipped with near field communication (NFC) technology, in particular in secure elements comprised in such mobile devices. Secure elements may be implemented as embedded chips, in particular as tamper-resistant integrated circuits with installed or pre-installed smart-card-grade applications, for instance payment applications, which have a prescribed functionality and a prescribed level of security.

SUMMARY

There is disclosed a mobile device comprising: a near field communication unit, a further communication unit being connected to the near field communication unit and being arranged to communicate with an external input device, a secure element being connected to the near field communication unit and being arranged to execute at least one application, the near field communication unit further being arranged to request, via the further communication unit, user input data for said application from the external input device, to receive said user input data from the external input device via the further communication unit, and to forward said user input data to the secure element.

In illustrative embodiments, the near field communication unit and the further communication unit reside in the same integrated circuit.

In illustrative embodiments, the further communication unit is a Bluetooth communication unit, in particular a Bluetooth low-energy communication unit.

In illustrative embodiments, the secure element is connected to the near field communication unit through an S2C interface or a SWP interface.

In illustrative embodiments, the user input data comprise user credentials.

Furthermore, there is disclosed a method for facilitating a transaction using a mobile device, said mobile device comprising a near field communication unit, a further communication unit connected to the near field communication unit and a secure element connected to the near field communication unit, the method comprising: the further communication unit communicates with an external input device, the secure element executes at least one application, the near field communication unit requests, via the further communication unit, user input data for said application from the external input device, the near field communication unit receives said user input data from the external input device via the further communication unit, and the near field communication unit forwards said user input data to the secure element.

In illustrative embodiments, the secure element executes said application in response to receiving a command from the external near field communication reader via the near field communication unit.

Furthermore, there is disclosed a computer program comprising executable instructions which, when being executed by a processing unit in a mobile device, cause said processing unit to carry out or control steps of a method of the kind set forth.

Furthermore, there is disclosed an article of manufacture including a non-transitory computer-readable storage medium having a computer program stored thereon that comprises executable instructions which, when being executed by a processing unit, cause said processing unit to carry out or control a method of the kind set forth.

In illustrative embodiments, a system is conceived which comprises a mobile device of the kind set forth, an input device and a near field communication device.

In illustrative embodiments, the input device is a wearable input device.

In illustrative embodiments, the wearable input device is a smart watch.

In illustrative embodiments, the mobile device is a mobile phone or a tablet.

DESCRIPTION OF DRAWINGS

Embodiments will be described in more detail with reference to the appended drawings, in which.

DESCRIPTION OF EMBODIMENTS

Figure 1:
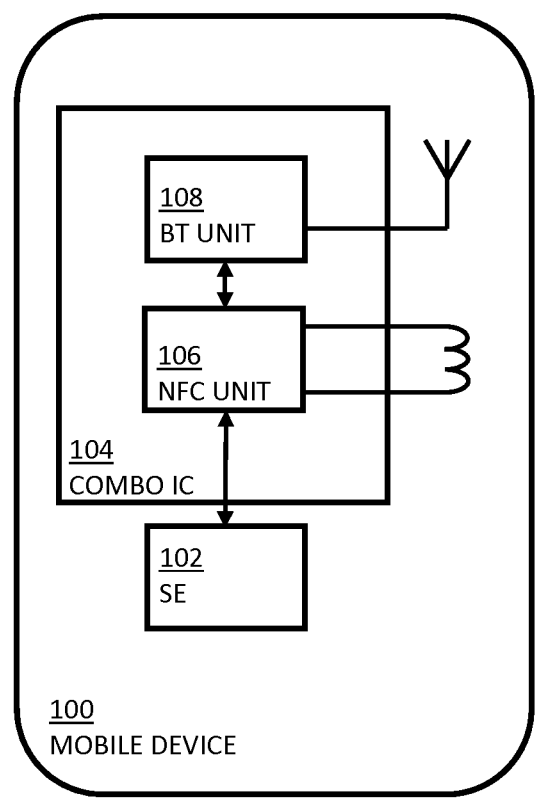
FIG. 1 shows an illustrative embodiment of a mobile device.

FIG. 1 shows an illustrative embodiment of a mobile device 100. In this example, the mobile device 100 comprises a secure element 102, an NFC unit 106 and a Bluetooth communication unit 108. The NFC unit 106 and Bluetooth communication unit 108 may be combined in a single integrated circuit, i.e. in a so-called combo IC 104. As mentioned above, in accordance with the present disclosure, the Bluetooth communication unit 108, which is an example of a further communication unit, is connected to the NFC unit 106 and is arranged to communicate with an external input device. Furthermore, the secure element 102 is connected to the NFC unit 106, and is arranged to execute at least one application. Furthermore, the NFC unit 106 is arranged to request, via the Bluetooth communication unit 108, user input data for said application from the external input device, to receive said user input data from the external input device via the Bluetooth communication unit 108, and to forward said user input data to the secure element 102. In this way, the risk that the user input data may be intercepted by, for example, malicious software, may be reduced, and consequently the user input data for the secure element 102 may be retrieved in a relatively secure manner. For example, in some illustrative embodiments the operating system of the mobile device 100 may not need to be involved in retrieving said user input data.

As mentioned, the NFC unit 106 and the Bluetooth communication unit 108 may reside in the same integrated circuit, i.e. in the combo IC 104. In this way, since the NFC unit 106 and the Bluetooth communication unit 108 may communicate with each other directly on-chip, the risk that the user input data may be intercepted may be further reduced. The secure element 102 may be connected to the NFC unit 106 through an $S^2C$ interface (also known as an NFC-WI interface) or an SWP interface, for instance, both of which may facilitate the transfer of data. Furthermore, the user input data may comprise user credentials, such as a PIN, which may be used by the application to authenticate the user, in order to unlock its functionality, for example. Alternatively or in addition, the user input data may be indicative of a confirmation or rejection of a transaction by the user. Furthermore, in some illustrative embodiments the Bluetooth communication unit 108 may be based on Bluetooth Low Energy technology (also known as Bluetooth Smart), which may reduce the energy consumption of the mobile device 100.

Figure 2:
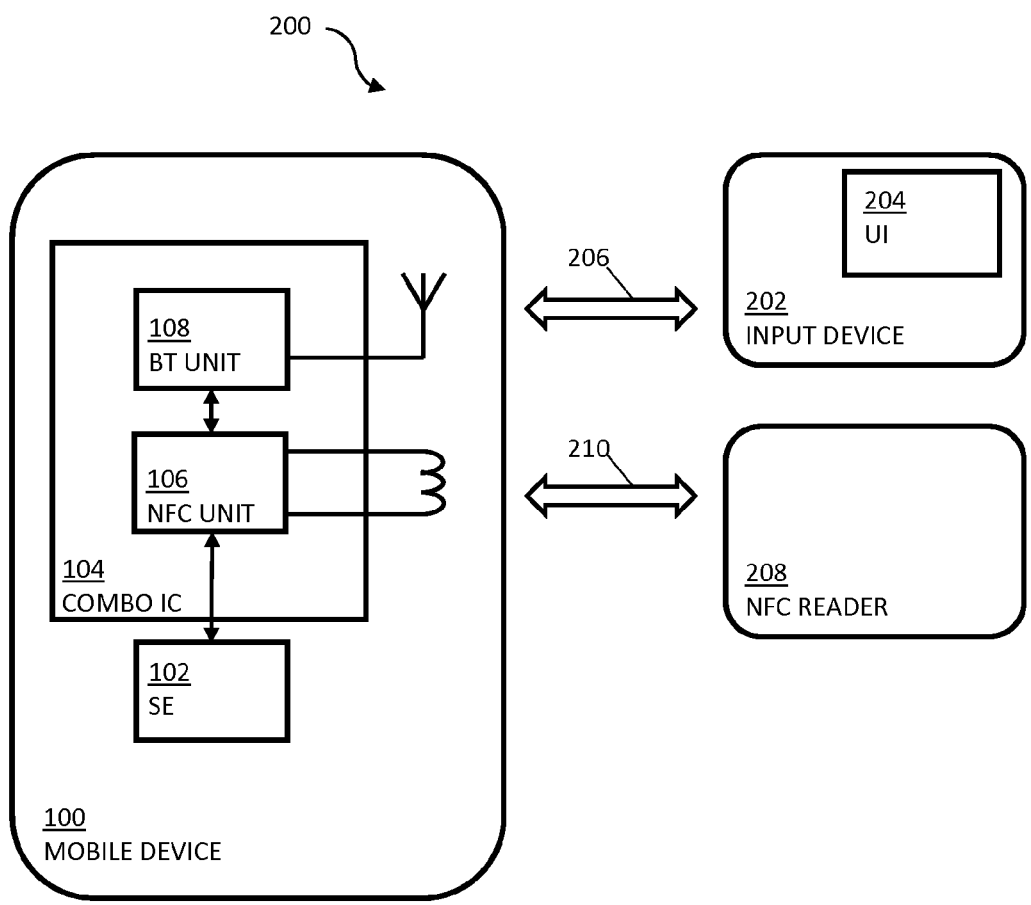
FIG. 2 shows an illustrative embodiment of a system for facilitating a transaction.

FIG. 2 shows an illustrative embodiment of a system 200 for facilitating a transaction. In addition to the mobile device 100 as described above, the system 200 comprises an input device 202 having a user interface 204 and an NFC reader 208. The user interface 204 may for example comprise a touch screen, a keypad, one or more buttons and/or a microphone. Furthermore, Bluetooth communication 206 may be established between the Bluetooth communication unit 108 and the input device 202, and near field communication may be established between the NFC unit 106 and the NFC reader 208. The input device 202 may be a wearable input device, such as a smart watch, which may provide a convenient way for the user to enter the input data. The mobile device 100 may be an NFC-enabled mobile phone or an NFC-enabled tablet, for instance. The input device 202 may contain a software application which receives and interprets requests for user input data, interacts with the user and generates and transmits responses comprising the user input data to the mobile device 100.

Figure 3:
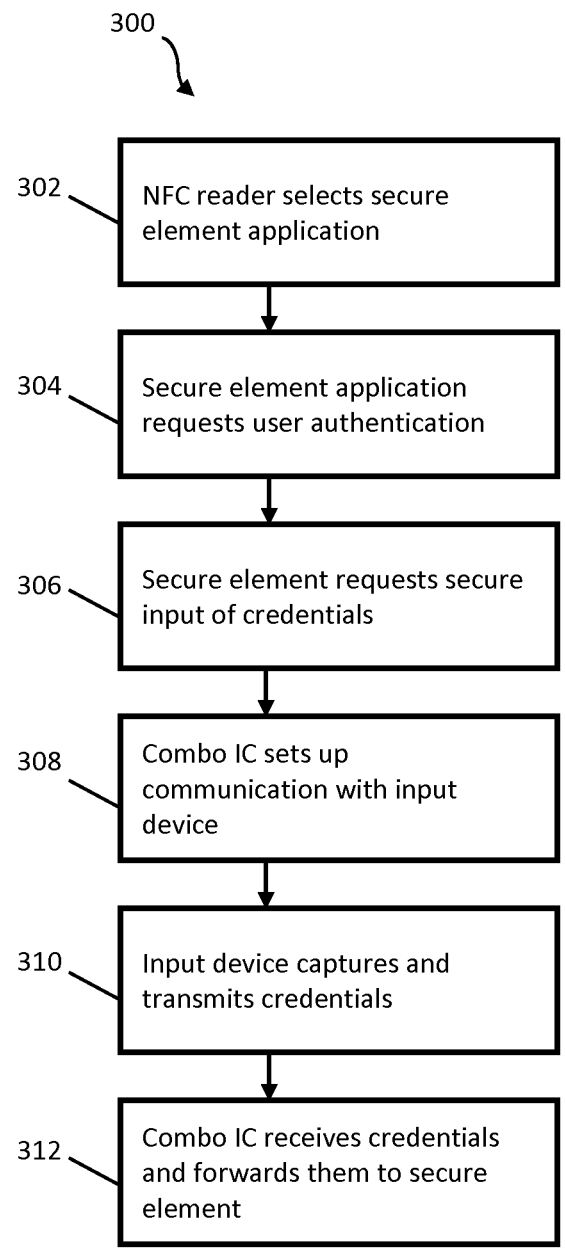
FIG. 3 shows an illustrative embodiment of a method for facilitating a transaction.

FIG. 3 shows an illustrative embodiment of a method for facilitating a transaction. In this example, the method comprises, at 302, that an NFC reader selects an application to be executed by the secure element of the mobile device. For instance, an NFC reader at a Point-of-Sale (POS) terminal may select, via the NFC unit of the mobile device, a payment application residing in, and executable by, the secure element. Alternatively, but without limitation, an application (app) contained in the mobile device may select an application of the secure element. At 304, the application executed by the secure element requests a user authentication, for example in the form of a PIN that it will verify before it unlocks its functionality. Thus, at 306, the secure element requests a secure input of user credentials. At 308, the combo IC sets up communication with the input device. Furthermore, at 310, the input device captures the user credentials, for example via a touch screen on which the user enters the credentials, and transmits said credentials to the mobile device, in particular to the Bluetooth communication unit embedded in the combo IC. At 312, the combo IC receives the credentials through the Bluetooth communication unit, and communicates them directly to the NFC unit, which in turn forwards them to the secure element.

In a more detailed example, whenever an application of the secure element is selected and it requires user authentication, it may signal this to the NFC unit in the combo IC. The secure element may be connected to the NFC unit by an $S^2C$ interface or an SWP (Single Wire Protocol) interface. In addition, there may also be a signaling wire that enables the NFC unit to indicate to the secure element whether it is communicating with an external NFC reader or with the host processor in the mobile device. The secure element may indicate that it requires a secure user input via the same signaling wire. The NFC unit may then set up a communication channel, via the Bluetooth communication unit, with the external input device. The application of the secure element may then send a message directly to the input device to indicate what kind of input it requires, optionally accompanied by a short text that is to be displayed to the user. The user may then respond on the input device, for example by inputting a PIN and/or by confirming or rejecting a transaction. This may be done using a touch screen of the input device and/or through buttons or a keypad. The user input may then be transmitted to the mobile device, where the Bluetooth communication unit in the combo IC may receive it and forward it to the NFC unit. The NFC unit may in turn forward the user input to the secure element.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 mobile device
102 secure element
104 combo IC
106 NFC unit
108 Bluetooth communication unit
200 system for facilitating a transaction
202 input device
204 user interface
206 Bluetooth communication channel
208 NFC reader
210 NFC channel
300 method for facilitating a transaction
302 NFC reader selects an SE application
304 SE application requests user authentication
306 SE requests secure input of user credentials
308 combo IC sets up communication with input device
310 input device captures and transmits credentials
312 combo IC receives credentials and forwards them to SE

The invention claimed is:

1. A mobile device comprising:
a near field communication unit,
a further communication unit being connected to the near field communication unit and being arranged to communicate with an external input device,
a secure element being connected to the near field communication unit and being arranged to execute at least one application,
the near field communication unit further being arranged to request, via the further communication unit, user input data for said application from the external input device, to receive said user input data from the external input device via the further communication unit, and to forward said user input data to the secure element.

2. A mobile device as claimed in claim 1, wherein the near field communication unit and the further communication unit reside in the same integrated circuit.

3. A mobile device as claimed in claim 1, wherein the further communication unit is a Bluetooth communication unit, in particular a Bluetooth low-energy communication unit.

4. A mobile device as claimed in claim 1, wherein the secure element is connected to the near field communication unit through an $S^2C$ interface or a SWP interface.

5. A mobile device as claimed in claim 1, wherein the user input data comprise user credentials.

6. A method for facilitating a transaction using a mobile device, said mobile device comprising a near field communication unit, a further communication unit connected to the near field communication unit and a secure element connected to the near field communication unit, the method comprising:
the further communication unit communicates with an external input device,
the secure element executes at least one application,
the near field communication unit requests, via the further communication unit, user input data for said application from the external input device,
the near field communication unit receives said user input data from the external input device via the further communication unit, and
the near field communication unit forwards said user input data to the secure element.

7. A method as claimed in claim 6, wherein the secure element executes said application in response to receiving a command from the external near field communication reader via the near field communication unit.

8. A computer program product encoded in a non-transitory computer readable medium, the computer program product comprising executable instructions which, when being executed by a processing unit in a mobile device, cause said processing unit to carry out or control steps of a method as claimed in claim 6.

9. An article of manufacture including a non-transitory computer-readable storage medium having a computer program stored thereon that comprises executable instructions which, when being executed by a processing unit, cause said processing unit to carry out or control a method as claimed in claim 6.

10. A system for facilitating a transaction, comprising a mobile device as claimed in claim 1, an input device and a near field communication device.

11. A system as claimed in claim 10, wherein the input device is a wearable input device.

12. A system as claimed in claim 11, wherein the wearable input device is a smart watch.

13. A system as claimed in claim 10, wherein the mobile device is a mobile phone or a tablet.

* * * * *